(12) United States Patent
Sharp

(10) Patent No.: US 10,550,748 B2
(45) Date of Patent: Feb. 4, 2020

(54) SECTIONED EXHAUST FILTER SYSTEM

(71) Applicant: Robert John Sharp, Camarillo, CA (US)

(72) Inventor: Robert John Sharp, Camarillo, CA (US)

(*) Notice: Subject to any disclaimer, the term of this patent is extended or adjusted under 35 U.S.C. 154(b) by 93 days.

(21) Appl. No.: 15/693,315

(22) Filed: Aug. 31, 2017

(65) Prior Publication Data

US 2018/0058297 A1    Mar. 1, 2018

Related U.S. Application Data

(60) Provisional application No. 62/382,262, filed on Sep. 1, 2016.

(51) Int. Cl.
| | |
|---|---|
| *F01N 9/00* | (2006.01) |
| *F01N 3/035* | (2006.01) |
| *F01N 3/20* | (2006.01) |
| *F01N 11/00* | (2006.01) |
| *F01N 3/027* | (2006.01) |
| *F01N 13/00* | (2010.01) |

(52) U.S. Cl.
CPC .............. *F01N 9/002* (2013.01); *F01N 3/027* (2013.01); *F01N 3/035* (2013.01); *F01N 3/2066* (2013.01); *F01N 11/002* (2013.01); *F01N 13/009* (2014.06); *F01N 13/011* (2014.06); *F01N 2240/36* (2013.01); *F01N 2560/06* (2013.01); *F01N 2610/1453* (2013.01); *Y02T 10/24* (2013.01); *Y02T 10/47* (2013.01)

(58) Field of Classification Search
CPC ...... F01N 9/002; F01N 13/009; F01N 13/011; F01N 3/027; F01N 3/035; F01N 3/2066; F01N 11/002; F01N 2240/36; F01N 2560/06; F01N 2610/1453; Y02T 10/24; Y02T 10/47
USPC ............................................... 60/286
See application file for complete search history.

(56) References Cited

U.S. PATENT DOCUMENTS

| | | | | |
|---|---|---|---|---|
| 4,835,963 | A * | 6/1989 | Hardy | F01N 3/023 123/323 |
| 6,074,619 | A * | 6/2000 | Schoubye | B01D 53/9431 423/239.1 |
| 6,304,815 | B1 * | 10/2001 | Moraal | F01N 3/035 60/285 |
| 2004/0112046 | A1 * | 6/2004 | Tumati | F01N 3/0256 60/297 |
| 2007/0175203 | A1 * | 8/2007 | Roozenboom | F01N 3/025 60/285 |
| 2009/0031702 | A1 * | 2/2009 | Robel | F01N 3/0222 60/274 |
| 2009/0178394 | A1 * | 7/2009 | Crane, Jr. | F01N 3/025 60/295 |

* cited by examiner

*Primary Examiner* — Justin M Jonaitis

(57) ABSTRACT

In accordance with at least one embodiment of an exhaust treatment system whereby parallel sections of exhaust filters such as Diesel particulate filters (DPF's) and a catalyst such as a selective catalytic reduction (SCR) system are integrated together while efficiently maintaining the temperature requirements of both. The parallel exhaust filter sections that may be heated and/or regenerated individually thereby facilitating catalyst temperature control and modulation of pressure drop across the exhaust filters.

16 Claims, 3 Drawing Sheets

SECTIONED EXHAUST FILTER SYSTEM

CROSS-REFERENCE TO RELATED APPLICATIONS

This application claims the benefit of PPA Ser. No. 62/382,262, filed 2016 Sep. 1 by the present inventor, which is incorporated by reference.

FEDERALLY SPONSORED RESEARCH

None.

SEQUENCE LISTING

None.

BACKGROUND

Emissions sources produce harmful air contaminants such as particulate matter (PM) and oxides of nitrogen ($NO_x$). The United States Environmental Protection Agency (EPA) and state and local agencies continue to tighten maximum emission limits. In order to meet increasingly stringent regulations, engine and boiler manufacturers and operators install exhaust treatment systems to remove emissions from the exhaust stream before release to the atmosphere. The devices within the exhaust treatment must typically be operated within a certain temperature range.

An example of a device commonly used to remove PM is an exhaust filter such as a Diesel particulate filter (DPF). A DPF traps particles entrained in exhaust gases. Hydrocarbons constitute much of PM, which can be burned-off or "regenerated". The typical DPF operating temperature range is between 540° C. to 650° C. during filter regeneration. If the exhaust gas temperature is too low, PM can build up and the DPF can clog. If a DPF runs too cold for too long, the filter can fail, cause a system failure, or the DPF can catch fire.

An example of a device commonly used to remove nitrous oxides ($NO_x$) is a selective catalytic reduction (SCR) system. An SCR converts $NO_x$ into less harmful emissions, such as nitrogen and water. SCR systems may comprise a catalyst that facilitates a chemical reaction between the $NO_x$ and a reductant. The reductant may be added to the gas stream and is absorbed onto the catalyst before it reacts with the $NO_x$ in the exhaust gas stream passing through the SCR system. However, for this reaction to properly take place, the exhaust gas temperature must typically be between 200° C. and 315° C.

Thus, there is a temperature incompatibility problem which has not been adequately solved. As stated above, the typical temperature range for DPF's is between 540° C. to 650° C. (during regeneration) and the typical normal operating temperature range for SCR's is between 200° C. and 315° C. This is problem because DPF's and SCR's are typically positioned in series with each other in the exhaust gas stream.

Various methods to heat the exhaust gas for proper DPF regeneration have been tried. Some typical examples disclose an oxidation catalyst, such as a Diesel oxidation catalyst (DOC), upstream of the DPF. The DOC oxidizes CO to $CO_2$, and/or NO to $NO_2$ in an exothermic reaction that releases heat into the exhaust gas and increases the temperature of the exhaust gas. Other examples inject hydrocarbon (HC) fuel upstream of the DOC which is oxidized by the DOC in an exothermic reaction that raises the temperature of the exhaust gas prior to entering the DPF. Still others employ electric heaters upstream of the DPF. Still others heat the DPF substrate directly by passing electrical current through conductive DPF filter element(s). Still others employ fuel burner(s) upstream of the DPF.

In the case where the SCR is located downstream of the DPF, and when the DPF is periodically heated to regeneration temperatures, the entire exhaust gas stream is heated. The disadvantage of this configuration is that it exposes the SCR to excessive temperature when the DPF is regenerated.

In response to this disadvantage, a workaround arrangement was tried in which the SCR is located upstream of the DPF and a heat source inserted between them. This arrangement allows the SCR to operate at a lower temperature and then the heat source is used to raise the temperature of the exhaust gas before entering the DPF. A disadvantage of this workaround arrangement is that the SCR is exposed to the particulate matter (PM) in the exhaust gas stream, which coats the SCR catalyst, which can soon severely reduce the SCR's effectiveness.

Some have tried to cool the exhaust gas stream ahead of the SCR by various means so that the SCR catalyst is not exposed to excessively high temperatures. This is sometimes accomplished using engine coolant. The disadvantage of cooling methods is that they add cost, complication, waste energy, and possibly consume coolant through the conversion of liquid coolant into vapor.

A further disadvantage of the above cooling methods is that they only work when the exhaust gas temperature is sufficiently high already as it comes from the emissions source. This may work in some applications. However, in other applications, such as a remote emissions treatment system, the exhaust gas is too cool and therefore must be heated prior to the DPF. It is therefore a disadvantage to waste of energy to immediately cool the exhaust gas after it has just been heated.

Others have tried passive thermal regulation. This can be a disadvantage because SCR catalysts work best within a narrow temperature range. When a system has no means of thermal regulation, then temperatures can vary significantly. For example, temperatures may be lower than optimum when the engine is at idle. Conversely, temperatures may be higher than optimum when the engine is at full load.

Thus, there have been many attempts to solve the issues regarding the exhaust gas temperature incompatibility in systems that use DPF's and SCR's. Thus, there remains a need for efficient temperature management for these systems.

SUMMARY

In accordance with at least one embodiment a means to integrate exhaust filters such as Diesel particulate filters DPF's and selective catalytic reduction (SCR) systems while efficiently maintaining the temperature requirements of both.

DRAWINGS

Figures

The novel features which are characteristic of the present invention are set forth in the appended claims. However, embodiments, together with further objects and attendant advantages, will be best understood by reference to the following detailed description taken in connection with the accompanying drawings in which:

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
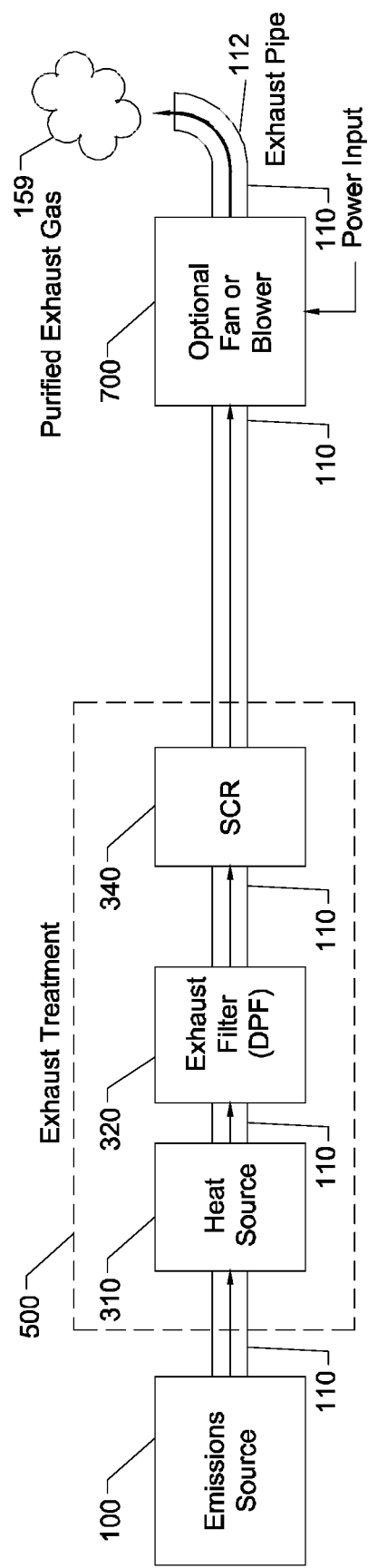
FIG. 1 shows an example typical exhaust treatment.

FIG. 1 shows an example typical (non-sectioned) emissions source fitted with a typical exhaust treatment comprising emissions source 100, exhaust treatment 500, optional blower 700, and exhaust pipe 112 all connected in series to each other by segments of exhaust duct 110. Optional exhaust blower 700 could be located anywhere along the exhaust path. Emissions source 100 may be, among others, an internal combustion engine, a Diesel engine, or a boiler. This example shows and an exhaust treatment comprising heat source 310, exhaust filter 320, and selective catalytic reduction (SCR) system 340, all connected in series to each other by segments of exhaust duct 110. Exhaust filter 320 in this example is a Diesel particulate filter (DPF).

Figure 2:
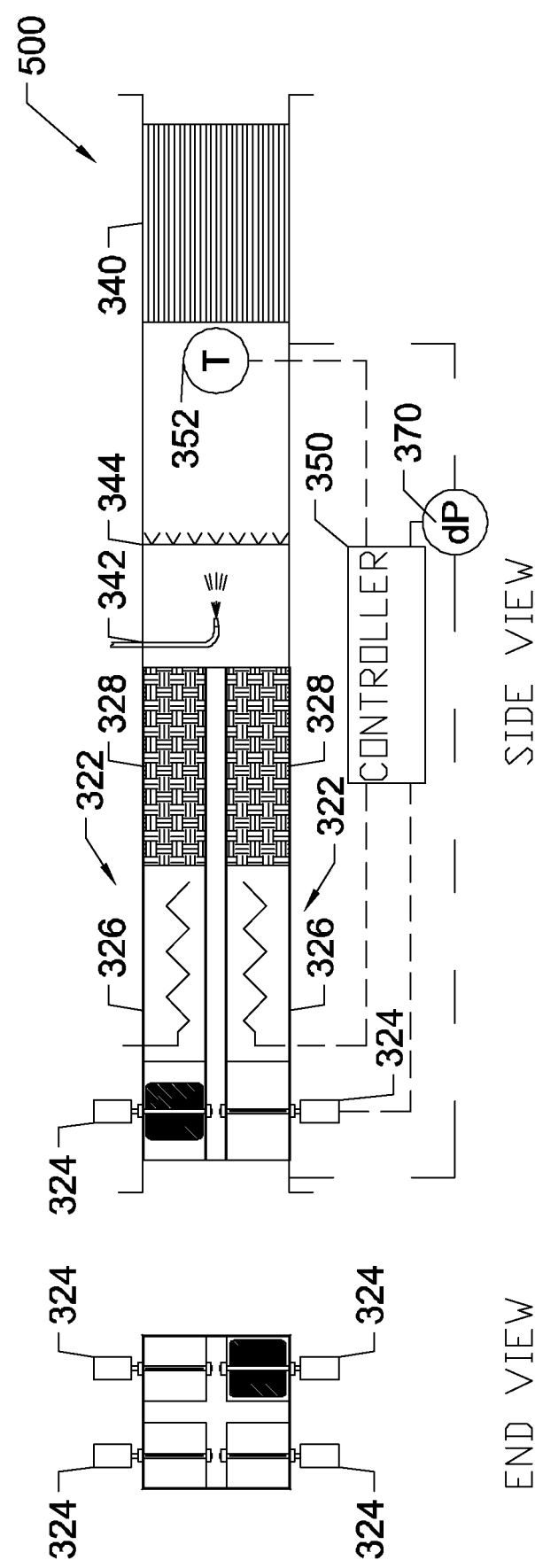
FIG. 2 shows an exemplary embodiment of a sectioned exhaust treatment.

FIG. 2 shows an exemplary embodiment of exhaust treatment 500 comprising at least two sets of DPF sections 322, reductant injector 342, gas mixer 344, and SCR 340, all connected in series with each other. Each DPF section 322 comprises exhaust gas modulating valve 324, heat source 326, and DPF filter element 328. This exemplary embodiment shows four (4) DPF sections 322 or n=4, although any practical number may be used. This exemplary embodiment shows DPF section 322 with a square cross section. However, any shape cross section (such as round) or any other configuration could be used as long as the exhaust gas flow can be accommodated.

Exhaust gas modulating valve 324 may be a butterfly valve, plunger valve, or any other type of valve suitable to an exhaust gas environment. Exhaust gas modulating valve 324 may be energized electrically, pneumatically, with vacuum, or any other commonly known method. In this exemplary embodiment, exhaust gas modulating valve 324 is a butterfly valve, supported at each end by bushings and attached to a rotary electric actuator that is capable of actuating between at least zero and ninety (90) degrees. At ninety (90) degrees, the valve is oriented to block the flow of exhaust gas 151. At zero degrees, the exhaust gas modulating valve 324 is oriented to maximize the flow of exhaust gas 151. In this exemplary embodiment, the "wings" of the "butterfly" in this butterfly valve 324 are shaped to allow a small amount of exhaust gas flow even when valve 324 is in the fully closed (zero degrees) position. Exhaust gas modulating valve 324 may be selected as a two-position valve that only positions at two positions (e.g. zero and 90 degrees). However, this exemplary embodiment uses a proportional valve that can select, at least, any position between zero and 90 degrees. The proportional ability allows fine-tuning of flow rate for each specific application.

Heat source 326 may be, among other possibilities, an electric heater or a gas-fired heater. Heat source 326 could also be an oxidation catalyst such as a Diesel oxidation catalyst (DOC). Furthermore, the oxidation catalyst may be used in conjunction with hydrocarbon (HC) injection. Yet another possibility is deriving heat from the DPF 328 filter elements themselves through electrification of conductive filter elements. In this exemplary embodiment, heat source 326 is integrated within the conductive DPF 328 filter elements. Heat source 326 is sized such that the amount of heat required to raise the exhaust gas 151 temperature to the minimum required temperature DPF regeneration temperature (individually) and minimum required SCR operating temperature (collectively) based on the lowest expected inlet temperature of exhaust gas 151 at the maximum expected flow rate.

Exhaust gas modulating valve 324 could be eliminated, however, by using a larger quantity of smaller DPF sections to achieve the same overall gas flow rate. In this configuration, the overall flow rate is maintained, but the amount of heat required per DPF section 322 is reduced and therefore the effect of each individual DPF section on the overall gas temperature is minimized. This is only possible, however, if the required regeneration time is relatively short, so that all of the DPF sections 322 can be regenerated one at a time and still meet the overall system regeneration requirements. Another requirement is that there is sufficient heat per section to sufficiently heat the DPF section at the unimpeded higher exhaust gas flow rate, which can be difficult. In this exemplary embodiment, however, exhaust gas modulating valves 324 are included.

Exhaust treatment 500 is designed, when valves 324 are included, such that the maximum expected volumetric flow rate can be accommodated with (n−1) DPF sections 322, per "set" (defined below) because one of the DPF subsystems 322 will typically be closed off (per set) to flow during regeneration. If a regeneration cycle takes, for example, 20 minutes per regeneration, and each DPF section 322 must be able to regenerate every hour, then this limits a "set" to six (4) DPF sections 322. Thus, in this example, the maximum flow rate must be accommodated by (n−1) or three (3) DPF sections 322. Of course, multiple "sets" may be used to accommodate the required flow rate. The number of DPF sections 322 may be further increased to reduce overall pressure drop and/or to add a factor of safety, especially in the case where DPF regeneration cycles are especially long and more than one section needs to regenerate concurrently.

Filter element 328, for this exemplary embodiment, is composed of commonly available DPF filter material.

Reductant injector 342 is shown in FIG. 2 in this exemplary embodiment as located directly downstream of DPF sub-assemblies 322. However, injector 342 could also be located upstream of this position, even upstream of the entire exhaust treatment 500. The reductant system in general is commonly available.

Gas mixer 344 is located downstream of injector 342. Gas mixer 344 is recommended but optional. Mixer 344 helps to provide the SCR catalyst with a homogeneous exhaust gas/reductant mixture stream.

In this exemplary embodiment, SCR 340 employs a catalyst composed of titanium vanadium tungsten compound. However, other materials could be used depending on the application.

Temperature sensor 352 is located just upstream of SCR 340 and is installed such that it measures the average temperature of the exhaust gas prior to the SCR. Controller 350 is in communication with temperature sensor 352.

Furthermore, controller 350 is in communication with heat source 310 and exhaust gas modulating valves 324.

Differential pressure sensor 370 measures the pressure across the DPF sections. The measured pressure is in communication with controller 350. Differential pressure sensor 370 and related components are optional if a fixed DPF regeneration timing is used.

Figure 3:
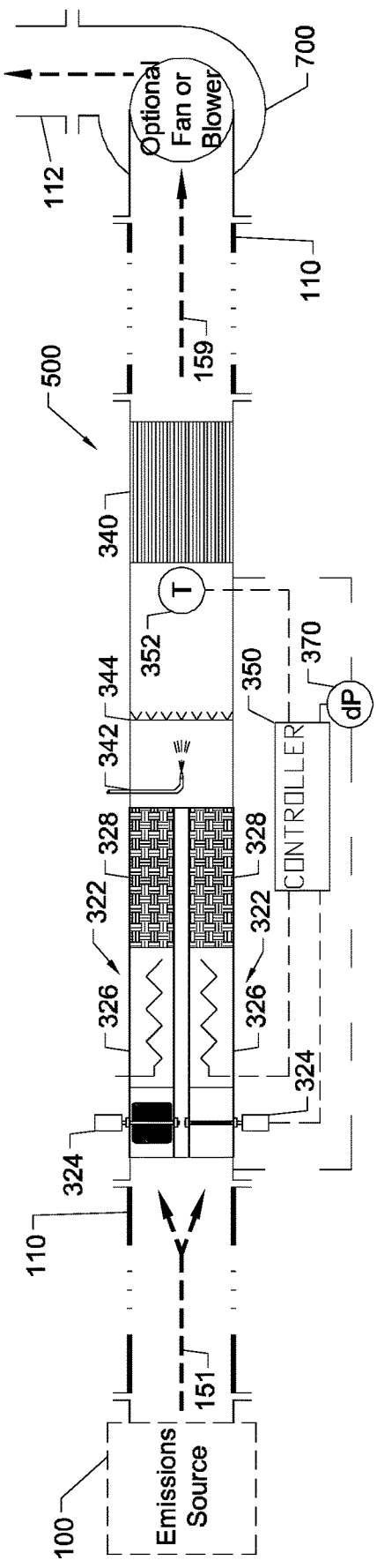
FIG. 3 shows operation of an exemplary embodiment of a sectioned exhaust treatment.

FIG. 3 shows one exemplary embodiment of exhaust treatment 500 installed in one exemplary application. At least one emissions source 100, exhaust treatment 500, optional blower 700, and exhaust pipe 112 are connected in series to each other by segments of exhaust duct 110. Optional exhaust blower 700 could be located anywhere along the exhaust path. Emissions source 100 may be, among others, one or more internal combustion engine(s), one or more Diesel engine(s), and/or one or more boiler(s). In this exemplary embodiment, emissions source 100 consists of any number of remotely located Diesel engines and/or boilers connected together so that a combined single stream of exhaust gas 151 is produced.

REFERENCE NUMERALS 100 emissions source
110 exhaust duct
112 exhaust pipe
150 exhaust gas
151 entering exhaust gas stream
152 entering exhaust gas stream as heated by heat exchanger
153 hydrocarbon (HC) injection
154 exhaust gas stream entering heat source
155 exhaust gas stream entering filter
156 filtered gas stream
157 reductant injection
158 gas stream entering SCR
159 purified gas stream
160 purified exhaust gas stream as cooled by heat exchanger
300 emissions treatment system
310 optional heater
322 DPF section
324 exhaust gas modulating valve
326 DPF heat source
328 DPF filter element
330 optional heater
340 selective catalytic reduction (SCR) system
342 reductant injector
344 mixer
350 controller
352 temperature sensor
360 exhaust valve
370 pressure sensor
500 exhaust treatment
502 exhaust treatment inlet
598 exhaust treatment outlet
700 fan
Operation FIG. 3 shows exhaust gas 151 created by emissions source(s) 100 which may comprise, for example, a combination of Diesel engine(s) and/or boiler(s). If there are multiple emissions sources, the exhaust gas may be combined into a single exhaust gas stream 151. Immediately upon leaving emissions source(s) 100, exhaust gas 151 may have initially have a temperature exceeding 400° C. However, as exhaust gas 151 travels through exhaust duct 110 it may cool considerably depending on the length of travel and the heat transfer characteristics of duct 110. This is especially true of remote emissions sources that are located a significant distance from the exhaust treatment. By the time exhaust gas 151 reaches emissions treatment system 300, its temperature may lower than is required to be efficiently processed by exhaust treatment 500.

As exhaust gas 151 enters exhaust treatment 500 is splits into "n" paths multiplied by the number of "sets", which is the total number of DPF sections 322. Exhaust gas modulating valve 324 is optional. If used, exhaust gas modulating valve 324 modulates the flow into each of the DPF sections 322. This valve is normally open to allow the flow of exhaust gas 151. However, during regeneration of a DPF section, this valve may be fully closed or partially closed. Closure of the valve reduces the flow rate of exhaust gas into each DPF section 322. Otherwise, in some configurations, it may be difficult to reach DPF regeneration temperatures with a high gas flow rate unless a large heat source is used. Exhaust gas modulating valve 324 allows a lower gas flow rate which helps to retain the heat within the DPF section 322 during regeneration, which allows filter element 328 to get sufficiently hot to burn off the PM. Thus, use of exhaust gas modulating valve 324 requires less heat, which has the advantage of saving energy.

Another advantage of incorporating exhaust gas modulating valve 324 to reduce the overall amount of heat necessary, by reducing the total amount of heat added to the overall exhaust gas flow, which in turn reduces the likelihood of creating excessive temperature downstream of the DPF's. Excessive temperature could 1) reduce SCR effectiveness by exceeding the optimal catalyst temperature or 2) damage the SCR.

After exhaust gas 151 passes exhaust gas modulating valve 324, it is exposed to heat source 326. When heat source 326 is energized, the temperature of exhaust gas 151 increases before entering the SCR.

Heat source 326 may be, among other possibilities, an electric heater or a gas-fired heater. Heat source 326 could also be an oxidation catalyst such as a Diesel oxidation catalyst (DOC). Furthermore, the oxidation catalyst may be used in conjunction with hydrocarbon (HC) injection. Yet another possibility is deriving heat from the DPF 328 filter elements themselves through electrification of conductive filter elements. In this exemplary embodiment, DPF filter element 328 and heat source 310 are one and the same.

After exhaust gas 151 flows past heat source 326, it enters the DPF filter element 328. DPF 328 traps particles entrained in exhaust gases. Hydrocarbons constitute much of PM, which can be burned-off or "regenerated". The typical DPF operating temperature range is between 540° C. to 650° C. during filter regeneration. Once regeneration has completed, exhaust gas modulating valve 324 is opened, and the heat is allowed to flow out of DPF section 322.

Thus, exhaust gas 151 typically enters exhaust treatment 500 at a relatively low temperature. However, the catalyst in SCR 340 typically requires an exhaust gas temperature between 200° C. and 315° C. One DPF section 322 per set will likely be regenerating, which means that one heater element per set will be raising the temperature of exhaust gas 151 to some extent. If additional heat is required, then some of the non-regenerating DPF sections 322 may be energized until sufficient heat is generated by all of the DPF sections 322 combined. Because the regeneration heat for is only applied 1/n of the DPF sections 322 per set, the amount of overall heat, once the gas flow from all the DPF sections is combined, is only 1/n as much, and the temperature will only rise 1/n as much, as compared to the case if only a single DPF were regenerated (as in the prior art). The significant advantage of this approach is that the SCR will not be exposed to excessively high temperatures during DPF regeneration. Since SCR 340 requires heat anyway to maintain its optimum operating temperature, then the DPF regeneration heat essentially "free". Thus, little or no additional energy is required to heat the exhaust gas prior to entering the SCR, which provides the advantage of higher overall energy efficiency.

Some prior art, in an effort to prevent excessive SCR temperatures, reverses the order, and places the SCR upstream of the heat source and exhaust filter. This design is not recommended because PM will coat the SCR catalyst, quickly reducing its efficiency. Placement of the exhaust filter upstream of the DPF has the advantage of preventing PM from coating the SCR catalyst thereby increasing SCR performance and extending SCR life.

All of the exhaust gas streams again reunite after passing completely though DPF sections 322. At this point in this exemplary embodiment, reductant injector 342 sprays reductant into the gas stream in an amount appropriate to treat the amount of $NO_x$ at the measured concentration and the flow rate of the total gas stream. The gas stream is then mixed to form a homogeneous mixture of $NO_x$, reductant, and exhaust gas as it passes through recommended gas mixer 344.

SCR 340 converts $NO_x$ into less harmful emissions, such as nitrogen and water. SCR 340 comprise a catalyst that facilitates a chemical reaction between the $NO_x$ and a reductant to substantially remove the $NO_x$ from the exhaust gas. The reductant is added to the gas stream is absorbed onto the catalyst before it reacts with the $NO_x$ as the exhaust gas stream passes through SCR 340. However, for this reaction to properly take place, the exhaust gas temperature must typically be between 200° C. and 315° C.

Temperature sensor 352 measures the temperature of filtered exhaust gas 158 and communicates this temperature to controller 350. Controller 350 uses the measured temperature to calculate how much heat will be required to raise the exhaust gas temperature in order to optimize the operation of SCR 340. Controller 350 also coordinates the regeneration of each DPF section 322. Controller 350 has the ability to control exhaust gas modulating valves 324 as well has heat sources 326.

Controller 350 actively controls the temperature of exhaust gas 158 that flows through the SCR 340 by energizing heat sources 326 and exhaust gas modulating valves 324 in a way to maintain the desired temperature at temperature sensor 352. SCR catalysts become inefficient when the temperature is too low or too high. In prior art, SCR temperatures could swing widely depending on operating conditions, which causes reduced SCR effectiveness. The actively controlled exhaust treatment, however, has the advantage of optimizing the SCR $NO_x$ reduction efficiency by maintaining an optimum SCR temperature.

Previous systems prevented excessively high SCR temperatures by using heat exchangers tied to a water coolant system. In those cases, where heat is applied in order to reach regeneration temperature, only to immediately cool the exhaust gas temperature again, energy is wasted. The combination of a segmented DPF and active thermal control has the advantage of reducing the amount of wasted energy. Furthermore, the elimination of the cooling apparatus has the advantage of reduced capital cost, reduced operating cost, and reduced complication. Furthermore, the elimination of a cooling apparatus that evaporates coolant has the advantage of eliminating the need to replace coolant regularly.

Differential pressure sensor 370 measures the pressure drop across the entire DPF assembly. Pressure sensor 370 transmits the pressure reading to controller 350. This pressure information can be used in a couple of ways: 1) control the regeneration rate and 2) trigger warning and alarm signals.

The pressure drop across the DPF can be controlled to by modulating the regeneration rate (e.g. the number of times a filter regenerates per hour). Increasing the regeneration rate decreases the pressure drop across the filter. Conversely, decreasing the regeneration rate increases the pressure drop. Furthermore, a lower pressure drop also generally relates to lower filter efficiency. Therefore, the filter efficiency may be actively controlled through the regeneration rate that is based on the measured pressure drop. This has the advantage of minimizing the energy used in regeneration as well as optimizing the filter efficiency for a wide range of operating scenarios. For example, for engines running at low loads typically produce higher amounts of PM. Controller 350 may be programmed to automatically detect increased PM loading through a higher pressure drop measurement and thus increase the regeneration rate accordingly. This has the advantage of preventing plugging of the DPF under certain conditions which can cause increased back pressure which reduces the overall efficiency or even cause damage to the emission source or the DPF.

The pressure drop measurement across the DPF can also be used to detect high and very-high pressure drops that can in turn be presented to the operator as warnings and alarms. This has the advantage of preventing a potential problem before the situation becomes so serious that it could lead to an inconvenient unscheduled shut down or even a catastrophic failure.

If optional blower 700 is used, then blower 700 helps to draw the exhaust gas out of exhaust treatment 500 and urges purified exhaust gas 159 out of the system. An advantage of the smaller heat requirement of the sectioned exhaust treatment is the volumetric flow rate is smaller when the exhaust gas is cooler. Thus, blower 700 draws less power and may be sized smaller due to the lower volumetric flow rate.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

CONCLUSION, RAMIFICATIONS, AND SCOPE

Thus the reader will see that at least one embodiment of a sectioned exhaust filter provides the following advantages:
(a) Increased energy efficiency because less heat is required in order to regenerate the exhaust filter when flow control valves are used.
(b) Prevents damage to SCR systems that would otherwise occur when the entire gas stream is heated to regeneration temperature.
(c) Increased SCR efficiency as a result of active temperature control that maintains the most efficient exhaust gas temperature for the SCR catalyst.

(d) Increased energy efficiency through use of already-available regeneration heat for use in controlling the SCR operating temperature.
(e) Increased energy efficiency because exhaust filters are not regenerated any more than necessary.
(f) Increased energy efficiency by optimizing of the amount of regeneration in response to pressure drop across the filter.
(g) Provides the ability to actively accommodate widely varying exhaust gas PM concentrations and exhaust gas flow rates.
(h) Prevents reduced filter performance due to clogging.
(i) Prevents inconvenient unscheduled shutdown due to filter clogging.
(j) Prevents catastrophic failure due to filter clogging.
(k) Provides warning of impending filter clogging or filter failure.
(l) Increased energy efficiency when a fan or blower is used to evacuate the exhaust gas from the exhaust treatment because of the lower volumetric flow rate of the exhaust gas that is not unnecessarily hot.
(m) Increased energy efficiency in those systems where the exhaust gas is heated upstream of the exhaust filter and then immediately cooled again upstream of the SCR.
(n) Cost reduction, reduced complication, energy savings, and the elimination of possible coolant loss through evaporation for applications that would otherwise require exhaust cooling upstream of the SCR.
(o) Prolonged SCR life and performance because particulate matter (PM) is removed from the exhaust stream upstream of the SCR.

Ramifications

Instead of every exhaust filter section existing inside a single container, the inlet exhaust stream may be separated and directed out to at least one separate external containers each containing an exhaust filter section. All the exhaust streams are then recombined into a single stream again before passing through the catalyst.

I claim:

1. A sectioned exhaust treatment system comprising:
a) an enclosure with an inlet and an outlet, whereas said inlet receives exhaust gas from an exhaust gas source, wherein said exhaust gas source is at least one item selected from the group consisting of diesel engines and boilers and internal combustion engines and turbine engines and sources of combustion;
b) said inlet in fluid communication with at least four parallel exhaust filter sections wherein each exhaust filter section includes an exhaust filter section inlet, a variable heat source, a filter element, and an exhaust filter section outlet;
c) all said exhaust filter section outlets being combined to form a recombined flow in fluid communication with a catalyst;
d) said catalyst in fluid communication with said outlet;
e) a temperature sensor positioned in said recombined flow, wherein said temperature sensor measures an exhaust gas temperature;
f) said temperature sensor in communication with a controller;
g) said controller in communication with each said heat source;
whereby, said controller modulates at least one said heat source as required to periodically regenerate said exhaust filter sections and modulate said exhaust gas temperature.

2. The system of claim 1, wherein said catalyst is a selective catalytic reduction (SCR) system.

3. The system of claim 1, wherein each exhaust filter section further comprises a normally open exhaust gas flow modulating valve, whereas said valve is at least partially closed during a regeneration cycle to reduce exhaust gas flow through said exhaust filter section whereby reducing the amount of heat required to achieve a regeneration temperature during said regeneration cycle.

4. The system of claim 1, wherein a sensor in communication with said controller measures the pressure drop across said exhaust filter sections, wherein said controller modulates the number and duration of exhaust filter regeneration cycles to optimize said pressure drop.

5. The system of claim 1, further comprising a reductant injector located downstream of said exhaust filter sections and upstream of said catalyst.

6. The system of claim 1, further comprising an exhaust gas mixer located downstream of said reductant injector and upstream of said catalyst.

7. The system of claim 1, wherein said exhaust filters occupy a single enclosure.

8. The system of claim 1, wherein said heat source is selected from the group consisting of electric heaters and gas-fired heaters and oxidation catalysts and conductive filter elements.

9. The system of claim 3, wherein said exhaust gas flow modulating valve is selected from the group consisting of normally open butterfly valves and plunger valves and slide valves and blocking flaps and blocking members and expanding diaphragms and expanding bladders.

10. A method comprising;
a) an exhaust gas stream is split into parallel streams through at least four parallel exhaust filter sections;
b) said parallel streams are recombined into a single recombined stream;
c) said recombined stream is urged through a catalyst;
d) an adjustable amount of heat is selectively added to said parallel exhaust filter sections;
e) a single temperature sensor placed in said recombined stream transmits a temperature measurement to a controller;
f) said controller sequentially modulates said heat to regenerate said exhaust filter sections while concurrently controlling said temperature of said recombined stream;
whereby predetermined regeneration temperatures are achieved in said exhaust filter sections while concurrently maintaining a predetermined temperature in said recombined stream as required for optimized function of said catalyst.

11. The method of claim 10, wherein said catalyst is a selective catalytic reduction (SCR) system.

12. The method of claim 10, wherein said parallel stream is individually modulated by a normally open valve to reduce gas flow during an exhaust filter regeneration cycle whereby reducing the amount of heat required to achieve regeneration temperature.

13. The method of claim 10, wherein a sensor in communication with said controller measures a pressure drop across said exhaust filter sections, whereby said controller modulates frequency and duration of said exhaust filter regeneration cycle to optimize said pressure drop while said controller concurrently maintaining said temperature of said recombined stream.

14. The system of claim 10 wherein said exhaust filters occupy a single enclosure.

15. The system of claim 10 wherein said heat source is selected from the group consisting of electric heaters and gas-fired heaters and oxidation catalysts and conductive filter elements.

16. The system of claim 12 wherein said valve is selected from the group consisting of normally open butterfly valves and plunger valves and slide valves and blocking flaps and blocking members and expanding diaphragms and expanding bladders.

* * * * *